United States Patent
Kao (10) Patent No.: US 12,482,581 B2
(45) Date of Patent: Nov. 25, 2025

(54) CARD-TYPE USB C TRANSFER DEVICE

(71) Applicant: PHIHONG TECHNOLOGY CO., LTD., Taoyuan (TW)

(72) Inventor: Ming-Shen Kao, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 589 days.

(21) Appl. No.: 17/966,841

(22) Filed: Oct. 16, 2022

(65) Prior Publication Data

US 2024/0105360 A1 Mar. 28, 2024

(30) Foreign Application Priority Data

Sep. 22, 2022 (TW) .................................. 111135992

(51) Int. Cl.
*H02J 7/00* (2006.01)
*H01B 9/00* (2006.01)
*H01R 31/06* (2006.01)

(52) U.S. Cl.
CPC ........... *H01B 9/006* (2013.01); *H01R 31/065* (2013.01); *H02J 7/0042* (2013.01)

(58) Field of Classification Search
CPC .............................. H02J 7/0042; H01B 9/006
See application file for complete search history.

(56) References Cited

U.S. PATENT DOCUMENTS

2021/0336396 A1* 10/2021 Gilde ...................... H02J 7/342

* cited by examiner

*Primary Examiner* — Robert Grant
(74) *Attorney, Agent, or Firm* — Chih Feng Yeh; Yongjean Consulting Inc.

(57) ABSTRACT

A card-type USB C transfer device, which includes a first connection interface for coupling and electrically connecting a portable power source, a second connection interface for coupling and electrically connecting at least one external device, an internal circuit electrically connected to the first connection interface and the second connection interface, and been configured to provide more than one power transmission paths between the portable power source and the external device, wherein the portable power source is detachably coupled to the card-type USB C transfer device through the first connection interface.

14 Claims, 8 Drawing Sheets

CARD-TYPE USB C TRANSFER DEVICE

CROSS-REFERENCE STATEMENT

The present application is based on, and claims priority from, Taiwan Patent Application Serial Number 111135992, filed Sep. 22, 2022, the disclosure of which is hereby incorporated by reference herein in its entirety.

BACKGROUND

Technical Field

The present invention relates to technology field of transferring electric power by adopting a charging-interface transfer device, and more particularly, a card-type USB C transfer device.

Related Art

At present, portable power tools are widely used in industry and daily life. Power tools usually utilize battery packs with high energy density as portable power sources to charge power tools. The battery pack contains multiple batteries, and there is an interface unit that make connection with the power tool or the charger. When the battery pack is connected with the power tool, the battery pack provide electric power to power the power tool. While the batteries in the battery pack are connected with an AC charging adapter, the batteries are charged for repeated use.

Removable and rechargeable battery packs are becoming ubiquitous as more and more electronic devices going wireless and advances in battery technology.

Such battery packs are typically part of a cordless power tool system and are designed and configured to operate with a variety of cordless power tools, such as drills, circular saws, and grinders. As is known in the art, battery packs and power tools include an interface system that enables the battery pack to be coupled to the power tool. Typically, these battery packs are charged by battery pack chargers that are designed and configured to charge specific battery packs. These chargers are designed and configured to plug into a wall outlet to receive power from AC power line. In general, the ability to use the aforementioned battery packs to power other non-power tool related electronic devices, such as mobile phones or low-power lamps, is also one of the design considerations.

As mentioned in previous section, nowadays, we are increasingly relied on mobile devices, such as smart phones, tablet computers, etc., day by day. Besides, there are still many existed mobile devices equipped with a non-replaceable battery, and many users choose to carry a mobile power supply to charge the mobile devices in order to cope with the long-term use throughout the day. Therefore, mobile devices that can support fast bidirectional charging/discharging to comply with the USB Type C specification have became an important choice for users.

At present, there are various specifications and protocols for various electronic equipments or devices with different charging/discharging voltage and power wattage requirements on the market, however it is difficult to meet all the needs of a multi-purpose device. Under this premise, only USB type C PD-related products can currently be provided that meet the needs of devices with high power and multiple voltage supplies.

However, battery pack of electric power tool does not provide any connecting equipment/device for charging/discharging the battery pack except the battery terminals.

SUMMARY

In view of the above problems, a card-type USB C transfer device is provided in the present invention. According on aspect of this invention, a card-type USB C transfer device includes a substrate, a first connection interface disposed on the substrate to couple and electrically connect with a portable power source, enabling the card-type USB C transfer device electrically coupled to the portable power source, a second connection interface disposed on the substrate to couple and electrically connect with an external device, an internal circuit electrically connected to the first connection interface and the second connection interface, and been configured to provide more than one power transmission paths between the portable power source and the external device.

In one preferred embodiment, the first connection interface is a connection interface including a plurality of connection terminals, the connection interface is gold finger connection interface or a DIN connection interface.

In one preferred embodiment, the second connection interface includes a first USB type C port, a second USB type C port and a first USB type A or Micro port.

In one preferred embodiment, the power transmission paths include a bi-directional power transmission path connecting the first connection interface and the first USB type C port to provide charging and discharging functionalities.

In one preferred embodiment, the bi-directional power transmission path is established by communicating between an external electronic device connected to the first USB type C port and a first power delivery (PD) controller electrically coupled to the first connection interface and the first USB type C port, (i) when the external electronic device is a power supply device, power of the external electronic device is controlled by the first PD controller to provide power to the external portable power source via a first charging path; (ii) when the external electronic device requires power, power of the external portable power source is controlled by the first PD controller to supply power to the external electronic device through a first discharge path.

In one preferred embodiment, the power transmission paths include a first unidirectional power transmission path connecting the first connection interface and the second USB type C port, and the external portable power source provides a unidirectional power delivery functionality.

In one preferred embodiment, the first unidirectional power transmission path is established by communicating between an external electronic device connected to the second USB type C port and a second power delivery (PD) controller electrically coupled to the first connection interface and the second USB type C port, when the external electronic device requires power, power of the external portable power source is controlled by the second PD controller to supply power to the external electronic device through a second discharge path.

In one preferred embodiment, the power transmission paths include a second unidirectional power transmission path connecting the first connection interface and the first USB type A or Micro port, and the external portable power source provides a unidirectional power delivery functionality.

In one preferred embodiment, the second unidirectional power transmission path is established by communicating between an external electronic device connected to the first USB type A or Micro port and the first PD controller, when the external electronic device requires power, power of the external portable power source is controlled by the first PD controller to supply power to the external electronic device through a third discharge path.

In one preferred embodiment, the first USB type C port and the second USB type C port are respectively connected with an external electronic device at the same time, and request the battery pack to supply power, corresponding power delivery ratios are allocated through a protocol.

According to another aspect of this invention, a card-type USB C transfer device includes a substrate, a first connection interface disposed on the substrate to couple and electrically connect with a portable power source, enabling the card-type USB C transfer device electrically coupled to the portable power source, a second connection interface disposed on the substrate to couple and electrically connect with an external device, an internal circuit electrically connected to the first connection interface and the second connection interface, and been configured to provide a plurality of power transmission paths between the portable power source and the external device, wherein the plurality of power transmission paths include a bi-directional power transmission path connecting the first connection interface and a first USB type C port, a first unidirectional power transmission path connecting the first connection interface and a second USB type C port, and a second unidirectional power transmission path connecting the first connection interface and a first USB type A or Micro port.

In one preferred embodiment, the first connection interface is a connection interface including a plurality of connection terminals, the connection interface is gold finger connection interface or a DIN connection interface.

In one preferred embodiment, the first USB type C port, the second USB type C port and the first USB type A or Micro port are disposed on the second connection interface.

In one preferred embodiment, the bi-directional power transmission path connecting the first connection interface and the first USB type C port to provide charging and discharging functionalities.

In one preferred embodiment, the bi-directional power transmission path is established by communicating between an external electronic device connected to the first USB type C port and a first power delivery (PD) controller electrically coupled to the first connection interface and the first USB type C port, (i) when the external electronic device is a power supply device, power of the external electronic device is controlled by the first PD controller to provide power to the external portable power source via a first charging path; (ii) when the external electronic device requires power, power of the external portable power source is controlled by the first PD controller to supply power to the external electronic device through a first discharge path.

In one preferred embodiment, the first unidirectional power transmission path connecting the first connection interface and the second USB type C port, and the external portable power source provides a unidirectional power delivery functionality.

In one preferred embodiment, the first unidirectional power transmission path is established by communicating between an external electronic device connected to the second USB type C port and a second power delivery (PD) controller electrically coupled to the first connection interface and the second USB type C port, when the external electronic device requires power, power of the external portable power source is controlled by the second PD controller to supply power to the external electronic device through a second discharge path.

In one preferred embodiment, the second unidirectional power transmission path connecting the first connection interface and the first USB type A or Micro port, and the external portable power source provides a unidirectional power delivery functionality.

In one preferred embodiment, the second unidirectional power transmission path is established by communicating between an external electronic device connected to the first USB type A or Micro port and the first PD controller, when the external electronic device requires power, power of the external portable power source is controlled by the first PD controller to supply power to the external electronic device through a third discharge path.

In one preferred embodiment, the first USB type C port and the second USB type C port are respectively connected with an external electronic device at the same time, and request the battery pack to supply power, corresponding power delivery ratios are allocated through a protocol.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The purpose of the present invention is to propose a new USB type C power delivery (PD) fast charge/discharge transfer device, which can be matched with a corresponding newly developed battery or a portable battery pack for power tools, so as to provide a combined portable and fast charge/discharge transfer device for a variety of portable electronic products, such as smartphone, notebook computer, tablet computer, monitor, power tool, electric vehicle and so on. The present invention can be extended to the development of many related electronic commodities using USB type C power supply, and gain business opportunities for developing multi-commodity applications in electronic devices through adopting the USB type C PD transfer device.

The technical problems to be solved by the present invention include: (a) how the USB type C controller controls the in/out of bidirectional power without conflicts and solves issues of the complex power channel arrangement, voltage/current communication, power control between battery modules and external charging/discharging equipment; (b) how the battery module applies various interfaces to connect with the transfer device to detect/control power; (c) how to match the corresponding power tool battery/power bank.

Figure 1:
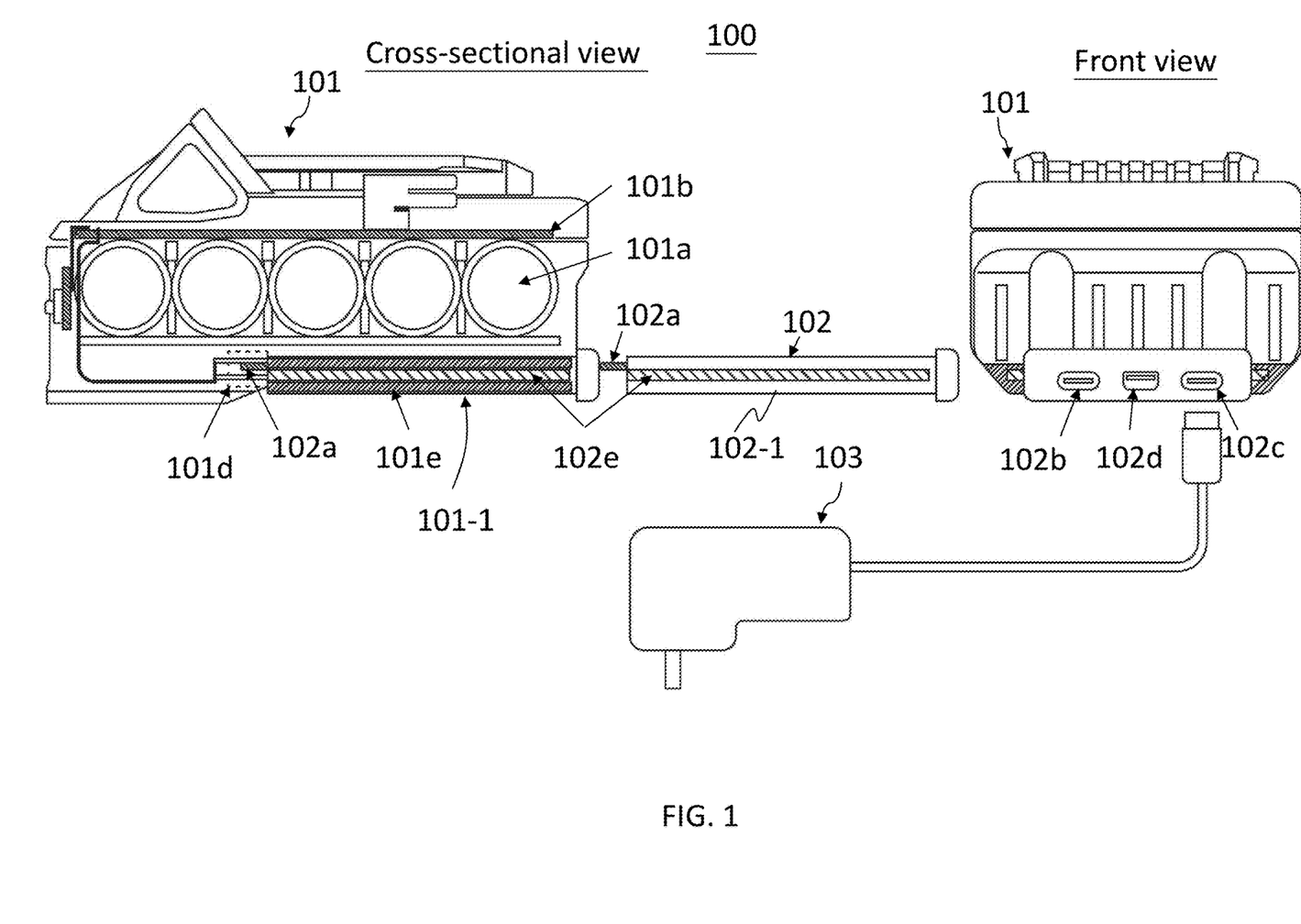
FIG. 1 illustrates a schematic diagram of a charging system related to a card-type USB C transfer device according to one embodiment of the present invention.

FIG. 1 shows a charging system 100 related to the card-type USB C transfer device of the present invention, the system includes: a portable power source 101 (such as but not limited to a battery pack of power tool), a card-type USB C transfer device 102 and a USB type C adapter 103. The left figure of FIG. 1 is a cross-sectional view of the inserted card-type portable power supply 101 and the inserted card-type USB C transfer device 102. The portable power source 101 includes a battery pack 101a, a battery pack management printed circuit board assembly (PCBA) 101b, a battery pack power terminal board 101c and a gold finger connector 101d electrically coupled to the battery pack management printed circuit board assembly (PCBA) 101b; the gold finger PCBA 102a of the inserted card-type USB C transfer 102 is electrically coupled to the gold finger connector 101d. The right figure of FIG. 1 is a front view of the inserted card-type portable power supply 101 and the inserted card-type USB C transfer device 102. The card-type USB C transfer device 102 has two sets of USB type C output ports (102b, 102c) and one set of USB Type A or Micro output port 102d, of which the USB type C output port 102c on the right is a bidirectional charging/discharging port, which can be used as a charging port for the USB type C adapter 103 to charge the battery pack located inside the portable power supply 101.

In one embodiment, the card-type USB C transfer device 102 can be inserted into the portable power supply 101 through the guide of the guiding rails 101e disposed in the card slot 101-1 of the portable power supply 101 through a pair of insertion guiding bars 102e.

In one embodiment, the card-type USB C transfer device 102 includes a substrate 102-1, a first connection interface (namely the golden finger PCBA 102a) disposed on the substrate 102-1 for coupling and electrically connected to the portable power source 101, so that the card-type USB C transfer device 102 is coupled with the portable power source 101; a second connection interface, that is, the above-mentioned two sets of USB type C output ports (102b, 102c) and a set of USB Type A or Micro output ports 102d, which are disposed on the substrate 102-1 for coupling and electrical connected to an external equipment/device; an internal circuit is disposed on the substrate 102-1, is electrically connected to the first connection interface and the second connection interface, and is disposed between the external portable power supply 101 and an external equipment/device to provide more than one power delivery/transmission path.

Figure 2A:
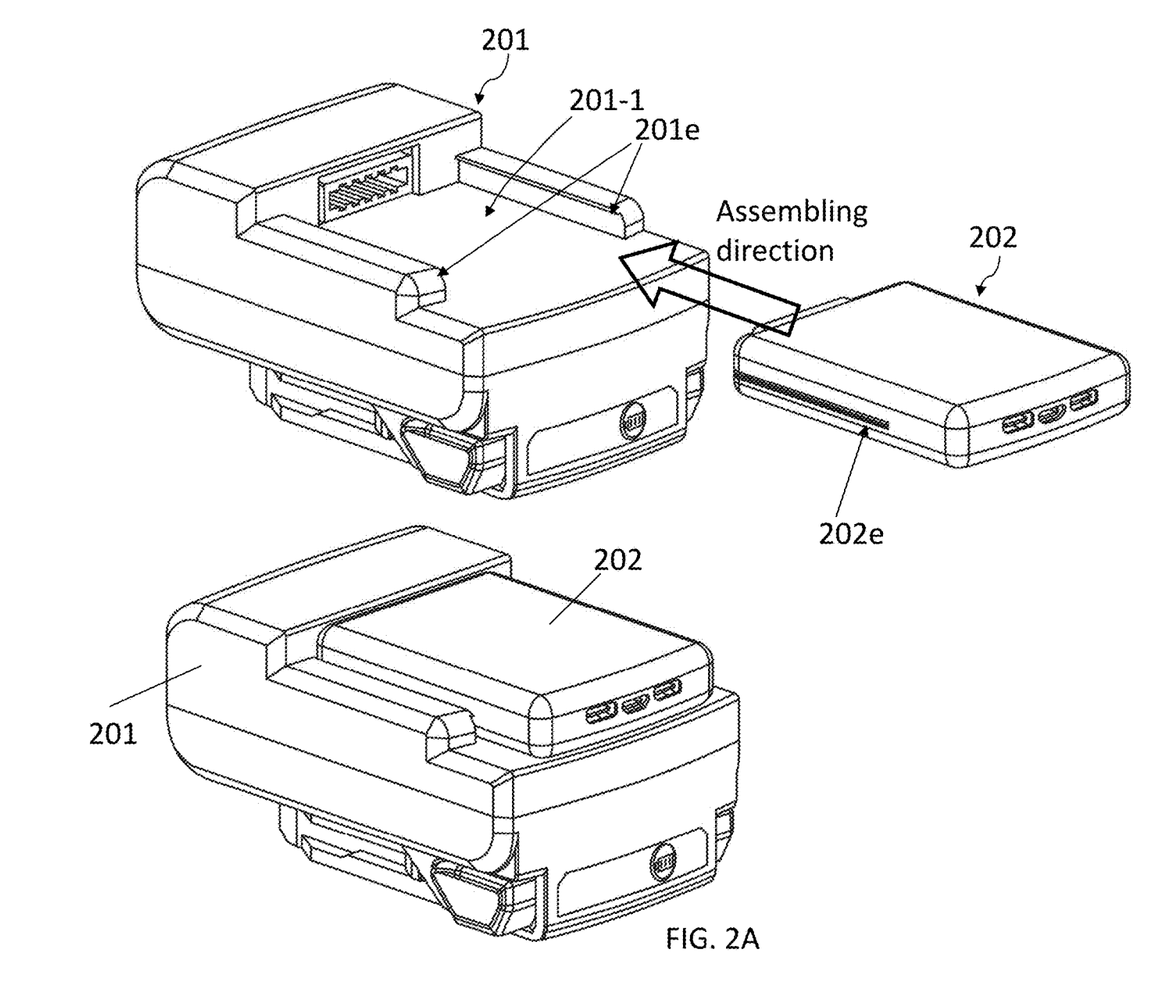
FIG. 2A shows an individual perspective view and a combined view of the inserted USB C transfer device and the battery pack of power tool according to one embodiment of the present invention.
Figure 2B:
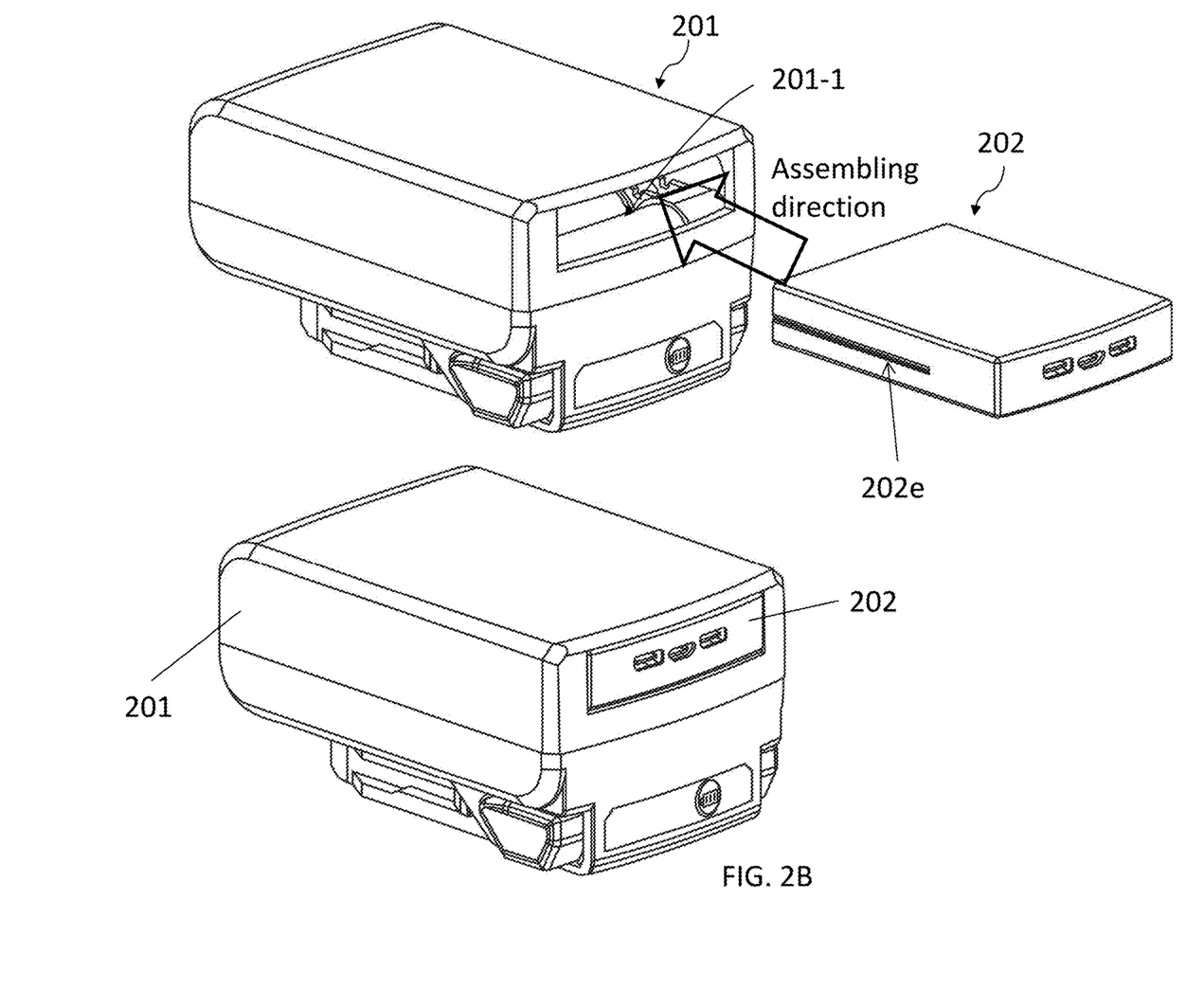
FIG. 2B shows an individual perspective view and a combined view of the inserted USB C transfer device and the battery pack of power tool according to another embodiment of the present invention.

FIG. 2A shows an individual perspective view and a combined view of the external inserted card-type USB C transfer device 202 and the portable power supply 201 disclosed according to one embodiment of the present invention, in the figure, the board guide rail 201e disposed in the card slot 201-1 of the portable power supply 201 can guide the card-type USB C transfer device 202 to be inserted into the guide bar 202e, so that the card-type USB C transfer device 202 can be embedded in the portable power supply 201; FIG. 2B shows an individual perspective view and a combined view of the inserted USB C transfer device 202 and the portable power supply 201 according to another embodiment of the present invention.

Figure 3:
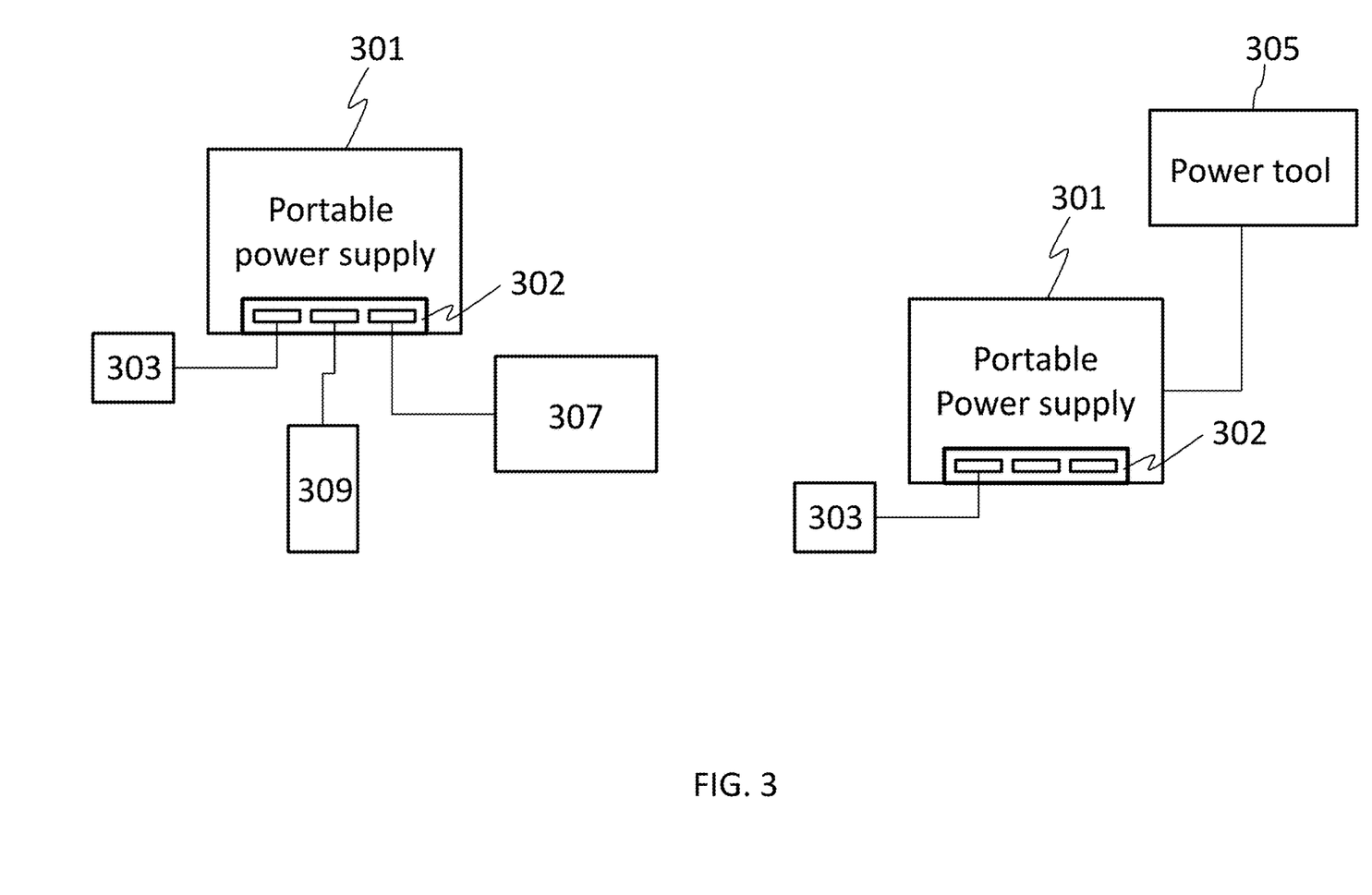
FIG. 3 illustrates a schematic diagram showing the application scenario of the inserted USB Type C transfer device combined with the battery pack of power tool according to one embodiment of the present invention.

FIG. 3 shows a schematic diagram of an application scenario of the inserted USB C transfer device 302 combined with the portable power supply 301 of the present invention. The diagram on the right side of FIG. 3 shows that the inserted card type USB Type C adapter 302 combined with the portable power supply 301 can be used as a power source for an external device 305 (such as, but not limited to, a power tool), while providing the USB C transfer device 302 as a charging interface to the portable power source 301 for charging the battery pack in the power supply 301; the left diagram of FIG. 3 shows that the inserted card-type USB C transfer device 302 combined with the portable power supply 301 can be used as a power source (equivalent to a power bank) for various electronic devices/equipments, for example, a notebook computer 307 or a smart phone 309, while providing the USB C transfer device 302 as a charging interface to charge the battery pack in the portable power supply 301.

The technology proposed by the present invention includes the following methods: (1) designing and utilizing two USB type C PD controllers to communicate with each other, to simplify the control of a DC-DC buck/boost converter/anti-reverse MOS switch/USB type C power controller/current detection circuit, to complete the complex communication detection and control issues between the battery pack and the external charging/discharging equipment; (2) battery module can utilize various interface connectors to connect with the transfer device and to overcome the power detection/control problem; (3) utilizing various interface connectors, such as gold finger and DIN connector, to combine with the portable power battery terminals, and adding functional options in the battery box, that is, adding a sense switch and related circuits can solve the problem that the portable power supply can only be combined with the specific transfer device. Related design details, please refer to the related circuit block diagram in FIG. 4.

According to the concept of the present invention, the card-type USB C transfer device disclosed in the present invention is suitable for a power supply device lacking a USB Type C interface, as shown in FIG. 2A, by configuring a portable power supply with an expansion card slot interface, such as the portable power supply with built-in card slot as shown in FIG. 2B, and can also be used for an external card slot. The card-type USB C transfer device proposed by the present invention utilizes the new power delivery (PD) specification of USB C PD 3.1+QC4.0, and the function includes providing bidirectional power up to 100 W. Because the transfer device is a bidirectional, it has the properties of a charger, for example, as a transfer device for power tools. It can charge rechargeable battery packs and power various electronic devices through its USB Type C port, with a maximum power supply of 100 W, and through its USB type A or Micro port can output up to 12 W.

The card-type USB C transfer device utilizes the power delivery or USB PD standard, which allows an electronic equipment/device to transmit or receive up to 100 W of electric power with different voltage and current distributions through its USB Type C port (supporting bidirectional power flow). These products allow discrete voltages of 5, 9, 12, 15 and 20V and currents up to 5 A. The PD standard uses a PD contract to establish a relationship between a PD device (in this case, a card-type USB C transfer device) and an attached device. The contract is an agreement between two PD devices connected via a Type C cable. There are many subtle distinctions, but the most basic limitations of each device are: (1) the source must establish and maintain an agreed-upon voltage within +/−4% while delivering up to the agreed-upon maximum current; (2) the sink can source any amount of current from 0 A all the way up to the agreed-upon maximum current. The current cannot exceed the maximum value for more than a few milliseconds.

A PD charger/provider/power supply is a device in a PD contract that agrees to supply power to its partner device. A PD consumer/load/receiver is a device in the PD contract that agrees to accept power from its partner device. A PD dual role port (DRP) device is a device that can act as a source or sink, depending on what is connected and its internal state. The USB C transfer device is a DRP device. The transfer device can provide wireless USB C source streaming limited only by the available battery pack, with a choice of longer-run or shorter-run battery packs to customize the user experience, and the battery pack size, larger or smaller as needed, is ergonomically preferred.

According to the concept and spirit of the present invention, the card-type USB C transfer device proposed by the present invention can be combined with a portable power supply having a corresponding interface through different kind of connector interfaces, such as plug-in (gold finger) connection, DIN link etc.

According to one aspect of the present invention, please refer to FIGS. 1-3, the above drawings depict the card-type USB C transfer device proposed by the present invention through a plug-in (gold finger) connection to a portable power supply with a corresponding interface.

Figure 4:
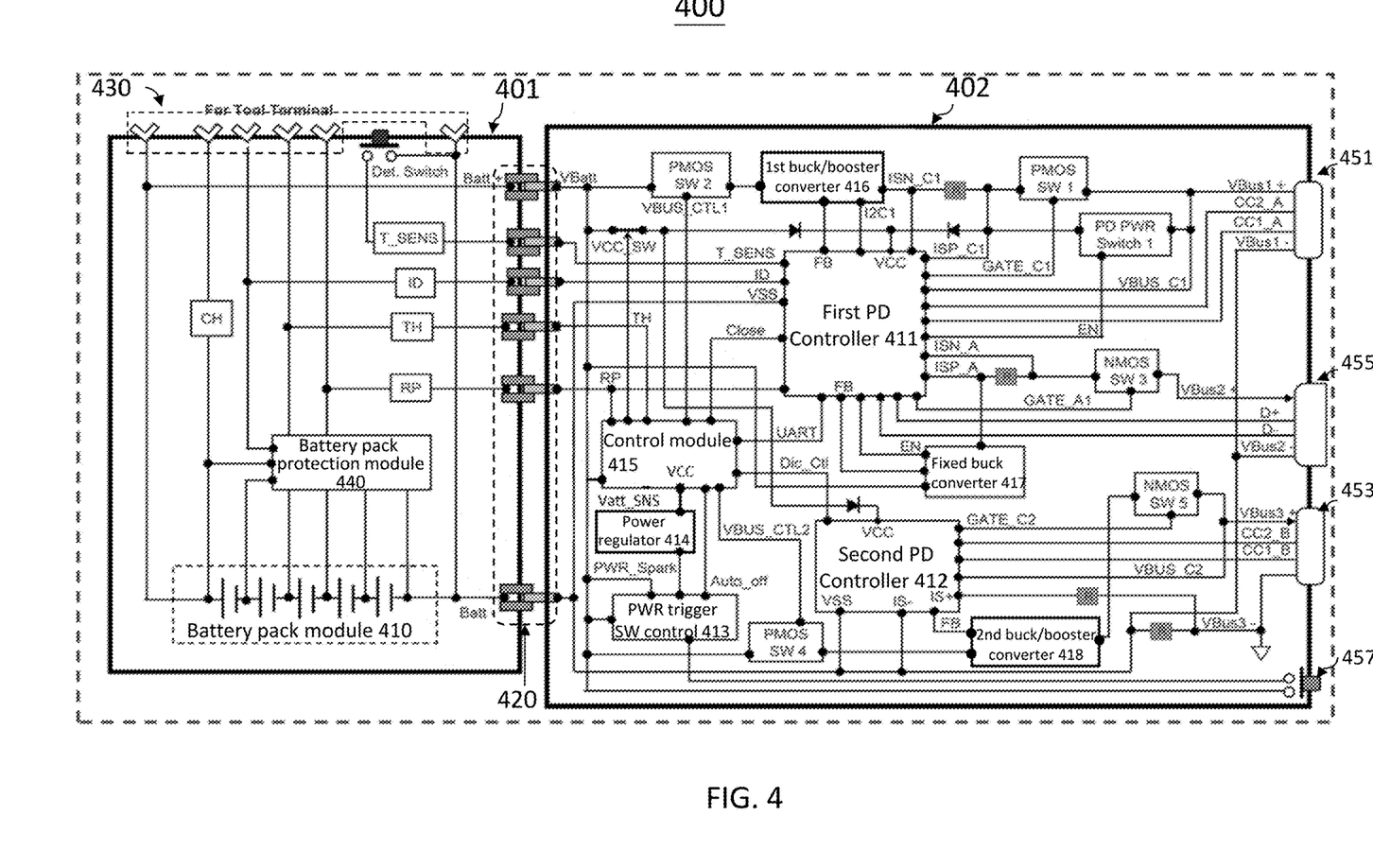
FIG. 4 shows the exemplary internal circuit block diagram of the battery pack combined with the card-type USB transfer device according to one embodiment of the present invention.

FIG. 4 shows an internal circuit block diagram 400 of a portable power supply 401 (e.g., but not limited to a battery pack) combined with a card-type USB C transfer device 402, where an external charger (e.g., a USB type C adapter) is connected to charge the battery pack 401 or the battery pack 401 supplies power to the external device, and the power is converted and transmitted through the card-type USB C transfer device 402.

Continuing from previous paragraph, the circuit block diagram 400 of FIG. 4 illustrates the relationship between the USB C transfer device 402 and the rechargeable/dischargeable battery pack module 410 inside the battery box 401. The coupling between the USB C transfer device 402 and the rechargeable/dischargeable battery pack module 410 is made by designing the USB C transfer device 402 as a thin board, so that it can be easily inserted into the expansion card slot of the portable power supply 401. The gold finger connectors 420 in the expansion card slot are connected to each other as a power transmission interface. In addition, the portable power supply 401 can be connected to an external device (including but not limited to power tool) through a plurality of connection terminals 430. When the SENS switch of the portable power supply is activated after connecting an external device (including but not limited to power tool), the first PD controller 411 is notified and the (electric) power transmission to external equipment is turned off by the first PD controller 411, and only USB type C charging can be performed. If the battery power of the battery module 410 is insufficient, the USB type C adapter can be inserted immediately to charge the battery pack module 410 in the portable power source 401, and the battery pack module 410 can be charged while discharging. In one embodiment, the rechargeable/dischargeable battery pack module 410 in the portable power supply 401 may include a plurality of rechargeable and dischargeable batteries connected in series and parallel. The battery pack 401 also includes a battery pack protection module 440, which can provide overvoltage, over-temperature and overcharge protections to the battery pack module 410. The battery pack 401 also includes circuits such as an identification circuit (ID), a thermistor circuit (TH), a wake-up circuit (RP), and a touch sensing circuit (T_SENS), which are respectively connected to different terminals of the gold finger connector 420.

The first USB type C port 451 of the card-type USB C transfer device 402 is a bidirectional port, it can provide external power to charge the battery pack module 410 with maximum power supply up to 100 W; if the first USB type C port 451 is used alone, it can also provide a maximum power of 100 W to an external device, while the second USB type C port 453 only provides external power, and the maximum power reaches 100 W when it is used alone; if the first USB type C port 451 and the second USB type C port 453 are provided power together, the power with a maximum power of 100 W is controlled and distributed by the first PD controller 411 and the second PD controller 412 (the distribution value is predetermined during design); if the USB Type A or Micro port 455 is used to provide power, it can provide a maximum output power of 12 W 5V/2 A; if the first USB type C port 451, the second USB type C port 453 and the USB Type A or Micro port 455 are used to provide power at the same time, the voltage of USB Type A or Micro port 455 remains unchanged; the output power of the first USB type C port 451 and the second USB type C port 453 depends on how much power the battery pack module can provide, and the sum of these two does not exceed 200 W.

The working principle between various removable board-type rechargeable/dischargeable portable power supplies, various removable card-type USB C charging/discharging transfer devices, and AC USB type C adapters or powered devices will be described as follows and be explained one by one. When the card-type transfer device is plugged into the battery pack, the power trigger control unit (PWR Trigger SW Control) 413 receives the PWR_Spark signal from the VBatt terminal and then transmits the power from the VBatt terminal to the power regulator 414 after adjusting the voltage. Then, it is sent to the control module 415 to short the VCC_SW switch to supply the power VCC to normally operate the first PD controller 411 and the second PD controller 412. In order to prevent the card-type USB C transfer device 402 from being plugged into the battery box for a long time and 401 not being used, causing static circuit damage and shortening the life of the battery pack module 410, an automatic timer is designed. As long as the power circuit is not used for more than 1 hour or a predetermined period of time, the control module 415 will notify the power trigger control unit (PWR Trigger SW Control) 413 through the Auto_off terminal to cut off the power from power regulator 414 supplied to the control module 415, so that the VCC_SW switch is in an open circuit state, and the VCCs of the first PD controller 411 and the second PD controller 412 are turned off and do not operate. In this state, there are two ways to turn on the charging/discharging circuit: 1. press the Wakeup switch 457; 2. unplug/plug the USB C transfer device 402 once to let PWR Spark signal retrigger power trigger control unit 413 for restoring the normal operation of the control module 415/the first PD controller 411 and the second PD controller 412. The following descriptions are listed for normally performed internal circuit block diagram 400 of a portable power supply 401 combined with a card-type USB C transfer device 402, so the above operations will not be repeated.

The first USB type C port 451 of the card-type USB C transfer device 402 is a bidirectional port, which can be used as charged/discharged port. When an external charging device, such as USB type C adapter, is inserted into the first USB type C port 451, the first PD controller 411 communicates with the external device via the CC1_A/CC2_A pins. When the communication protocol announces that charging port (i.e. the first USB type C port 451) becomes the source terminal, the power of the USB type C adapter enters the PMOS SW1 switch through VBus1 terminal of the first USB type C port 451. At this moment, the PMOS SW1 switch is controlled to be in a closed state, and the PD PWR Switch 1 is controlled to be in an open state, and the power enters the ISP_C1 and ISN_C1 current detection nodes from the PMOS SW1, and is detected by the first PD controller 411 and then enters the first Buck/Boost converter 416. At the same time, the control module 415 monitors the voltage of Vbatt provided by the VBatt_SNS pin, the control module 415 connects the first PD controller 411 through the UART pin, and utilizes I2C1 pin to control the first Buck/Boost converter 416 for determining the battery pack module 410 should be charged in trickle or constant current (CC) or constant voltage (CV) charging mode. Meanwhile, the first PD controller 411 also controls the PMOS SW2 switch to be closed, and the power converted by the first Buck/Boost converter 416 is fed into the battery pack 401 through the card connector 420 to start the charging operation.

The first USB type C port 451 of the card-type USB C transfer device 402 is a bidirectional port. When an external device is inserted into the first USB type C port 451 and requires to provide power into it, the first USB type C port 451 becomes a sink port, the first PD controller 411 communicates with the external powered device through the CC1_A & CC2_A pins. When the communication announces that the first USB type C port 451 is used for delivering power, the (electric) power of the battery pack module 410 enters into the PMOS SW2 switch, which is controlled to be closed by the first PD controller 411, through the Card Connector 420. At the same time, the power transmission path passes through PMOS SW4 switch is not required to supply power, so it is controlled by the second PD controller 412 to be open-circuited and not actuated. The power of the battery pack module 410 only enters the first Buck/Boost converter 416 through the closed-circuit PMOS SW2 switch for charging external device/equipment. How to operate the charging process to the connected external device is determined by the first PD controller 411 after receiving the power request message from the CC1_A/CC2_A pin and then controlling the first Buck/Boost converter 416 through I2C1 pin to determine which charging mode should be applied, for example, trickle/CC/CV charging mode, then sink power to the ISN_C1 and ISP_C1 current detection nodes to be monitored by the first PD controller 411, and then enters the two switch nodes of the PMOS SW1 switch and the PD PWR Switch 1 switch. Meanwhile, since the first PD controller 411 determines that the first USB type C port 451 is a sink, so the first PD controller 411 controls the PMOS SW1 to be opened and the PD PWR Switch 1 to be closed, so that the power can flow through the PD PWR Switch 1 and can be transmitted to the VBus1 terminal of the first USB type C port 451 for providing power to external device/equipment. How much current/voltage needs to be exported is controlled by the first PD controller 411 and the external device after the communication protocol is announced and determined.

The USB type A or Micro port 455 of the card-type USB C transfer device 402 is the sink end of the one-way power supply port. When an external device, for example an USB type C adapter is inserted into the USB type A or Micro port 455, once the communication between them is confirmed, the power of the battery pack module 410 flows to the fixed buck converter 417 through the card connector 420, and then enters into the ISP_A and ISN_A current detection nodes to be monitored by the first PD controller 411. The EN pin of the first PD controller 411 controls the fixed buck converter 417 to operate and pass power to the NMOS SW3 switch that has been controlled as a closed circuit, and then enters into the VBus2 terminal of the USB type A or Micro port 455 to supply 5V power to the external device. While using the USB type A or Micro port 455 to delivery power, if other devices are plugged into the first USB type C port 451 and the second USB type C port 453 for use, the power delivery process of USB type A or Micro port 455 will not be affected whether they are powered or charged by the battery.

The second USB type C port 453 of the card-type USB C transfer device 402 is a one-way power supply port. When the external device is inserted into the second USB type C port 453 only, it communicates with the external device, once the communication announces that it requires a battery to provide power, the second USB type C port 453 is sink terminal. Power of the battery pack module 410 is transmitted to the PMOS SW4 switch through the card connector 420. The PMOS SW4 switch is controlled by the second PD controller 412 to be in a closed state. Meanwhile, the battery ID, CC1_A and CC2_A signals detected by the first PD controller 411 are justify through VBatt/TH signal and other battery pack module related signals detected by the UART terminal and the control module 415, and the Dic_Ctl of the control module 415 communicates with the second PD controller 412 to determine what percentage of power should be supplied to the connected external device. For example, when both the first USB type C port 451 and the second USB type C ports 453 are sink terminals, each of them provide 50% power. If only one of them supply power, one of which provide 100% power. The design can be modified according to the current power of the battery pack module. If the USB type A or Micro port 455 is not connected to any external device, the NMOS SW3 switch is controlled to be opened by the first PD controller 411, and the fixed buck converter 417 is also controlled by the EN pin of the first PD controller 411 to be inactive, the PMOS SW1 switch and the PD Power Switch 1 switch are controlled to be open-circuited. On the contrary, when the first USB type C port 451 or the USB type A or Micro port 455 receives the Source or Sink message of the external device, the first USB type C port 451 or the USB type A or Micro port 455 will independently perform actions according to individual requirements. Continuing from the above, the PMOS SW4 switch is set to close-circuit to transmit the power of battery pack module 410 to the second Buck/Boost converter 418, which charging mode, such as trickle/CC/CV, is performed by the second buck/boost converter 418 based on the communications between the CC1_B and CC2_B terminals and a connected external device. The converted power is transmitted to the NMOS SW3 switch and then enters the VBus3 terminal to output power to the external device. The second Buck/Boost converter 418 monitors the supply current through the IS−/IS+ terminals of the second PD controller 412. How much current/voltage supplies to external devices via VBus3 is determined by three-party communication protocol between the second PD controller 412, the control module 415 and the external device, and a single USB type C port can only provide a maximum power of 100 W according to the circuit design.

In the same state as described in the previous paragraph, if the first USB type C port 451 and the second USB type C port 453 have devices that require power supply at the same time, at this moment, the first PD controller 411 will use the UART terminal to communicate with and the control module 415 to negotiate how much percentage of power (unit: % W) should be shared by the above two ports individually. If the battery power (unit: Whr) is relatively large, the two USB type C ports can be designed to share 100% of the output power up to maximum 100 W. If the battery power (unit Whr) is relatively small, each will give 50% output.

In the same state as described in the previous paragraph, when the second USB type C port 453 is in a power delivery state (i.e. providing power to connected external device), the first USB type C port 451 can also provide charging path to the battery pack module 410 through an external USB type C adapter at the same time, and the circuit operates as described previously. The charging control program on the source side is provided to charge the battery pack, and the USB C transfer device 402 can charge the rechargeable battery pack module 410 up to a maximum of 20V/5 A 100 W (limited by the battery pack module and adapter conditions).

In the same state as described in the previous paragraph, the second USB type C port 453 is in a power delivery state, at this moment, the battery pack module 410 can be charged through the first USB type C port 451 by the external USB type C adapter at the same time, and the circuit operates as mentioned above. The charging control on the source side is provided to charge the battery pack module 410, and the card-type USB C transfer 402 can charge the battery pack module 410 with a maximum of 100 W. If a power tool must be used, the "For Tool Terminal" pin of the battery pack 401 can be inserted into the power tool, and the Det. switch is pressed when the battery pack 401 is combined with the power tool, and the Det. Switch sends a T_SENS signal to the first PD controller 411 through the card connector 420. At this moment, the first PD controller 411 turns off the fixed Buck converter 417, PD PWR switch and other power transmission paths through EN pin for not supplying power to outside, and at the same time, the control module 415 is connected through the UART interface to make all the external power supply paths of the second power supply controller 412 open-circuit. The external devices connected to the first USB type C port 451, the second USB type C port 453 and the USB type A or Micro port 455 are no longer been provided power thereto, and only the first USB type C port 451 is allowed to used to charge the battery pack 401.

Figure 5:
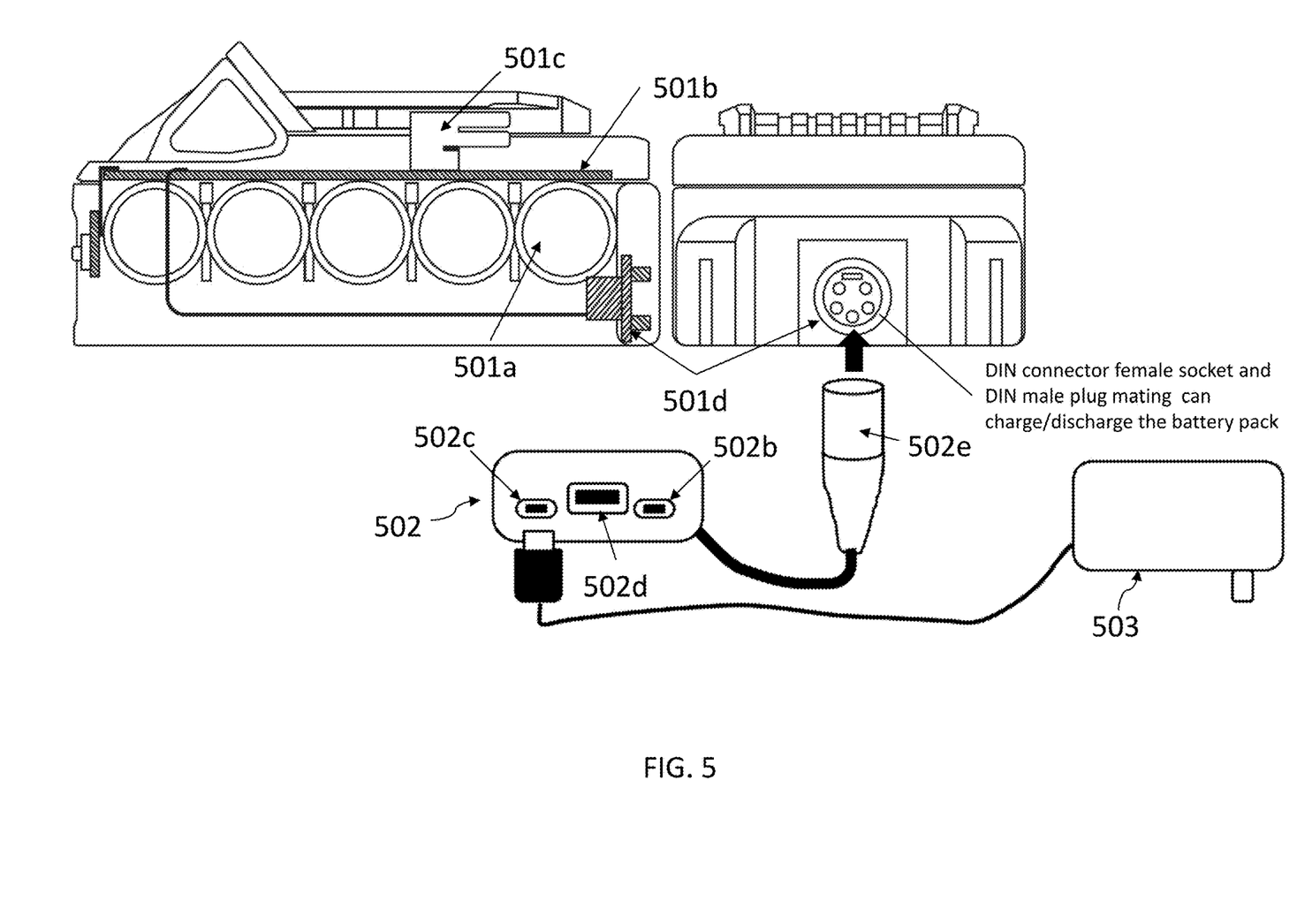
FIG. 5 shows a schematic diagram of a charging system related to a card-type USB C transfer device according to another aspect of the present invention.
Figure 6:
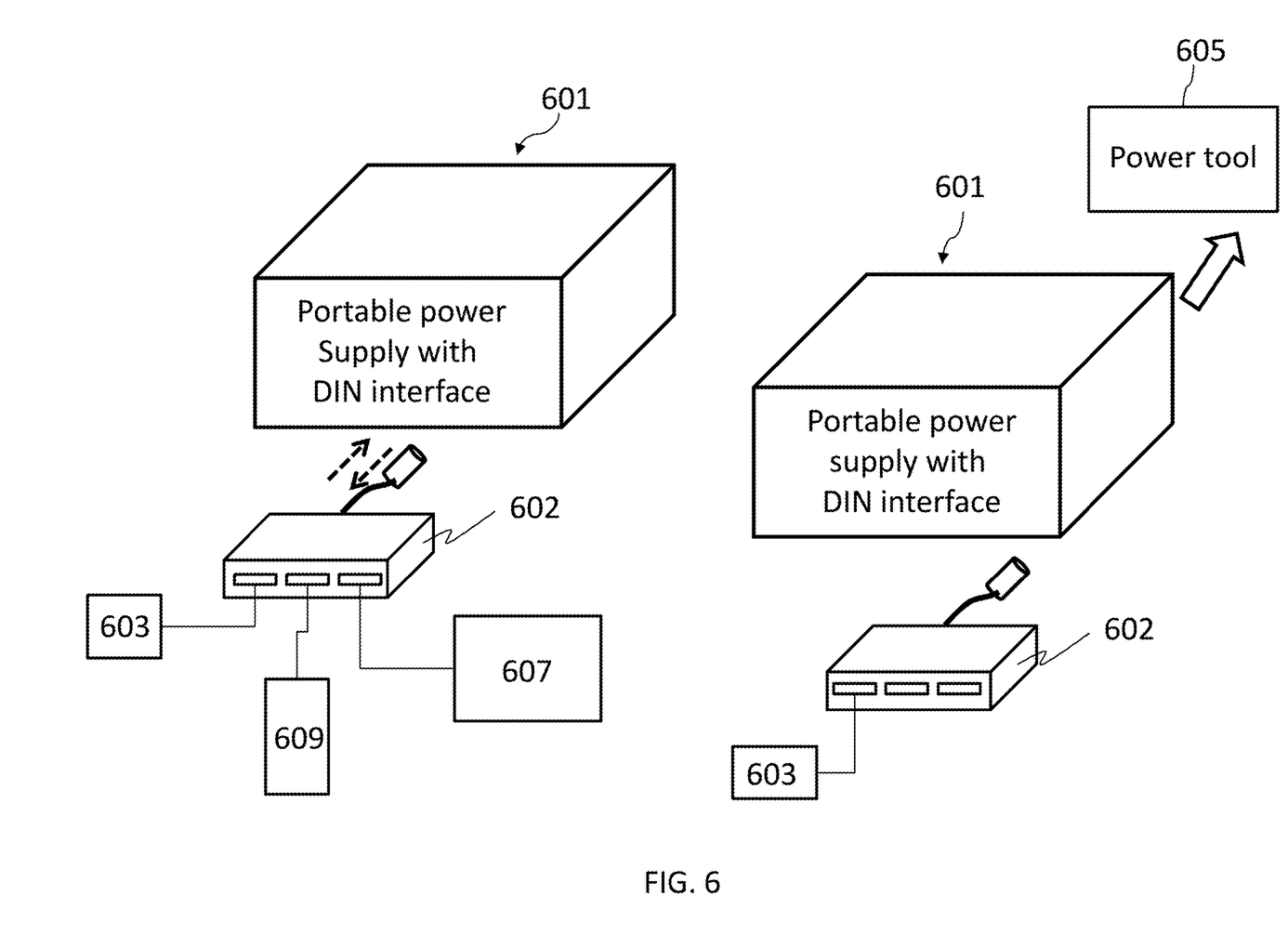
FIG. 6 illustrates a schematic diagram showing the application scenario of the card-type USB C transfer device of the present invention combined with a battery pack of power tool with a built-in DIN interface.
Figure 7:
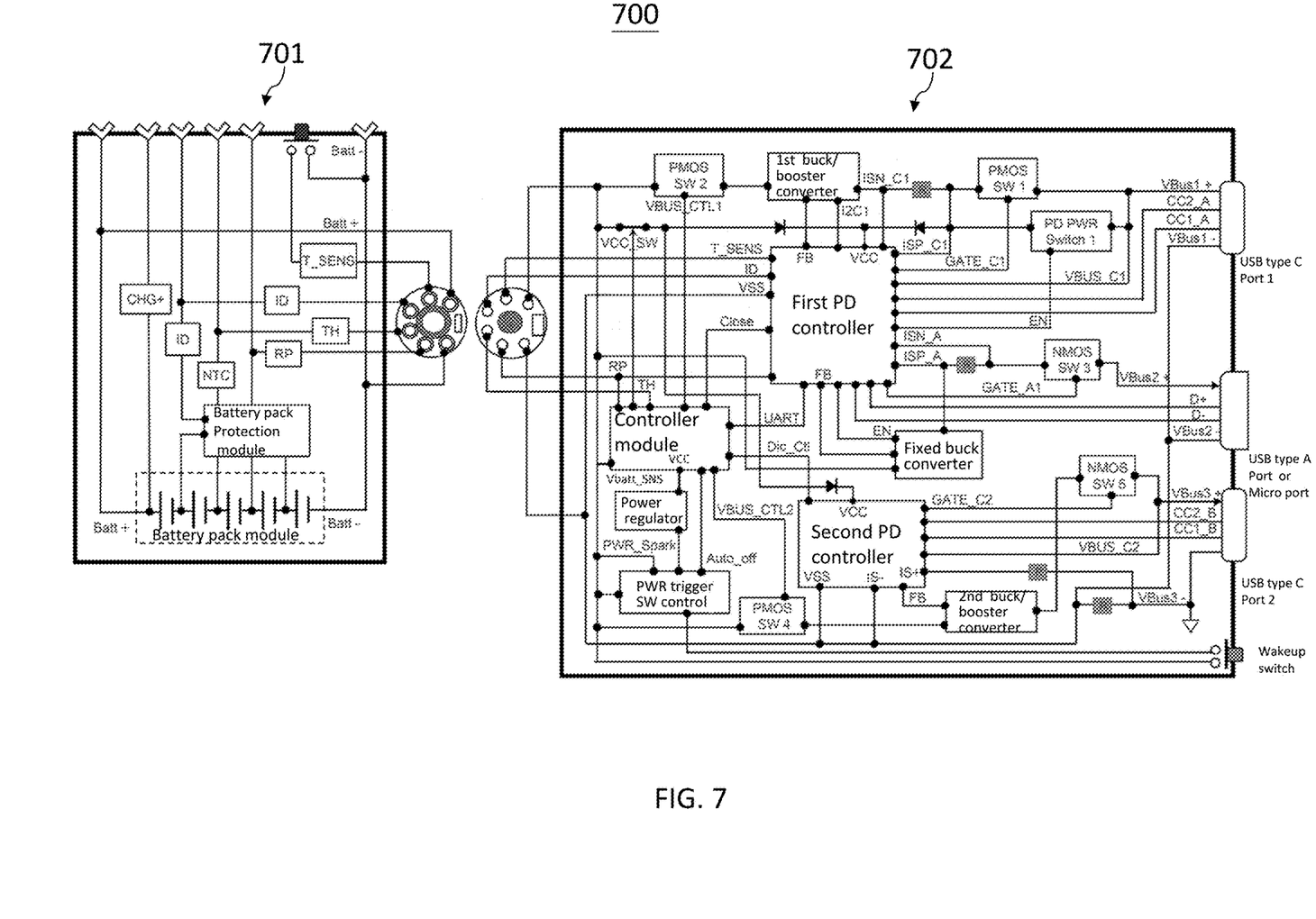
FIG. 7 illustrates the exemplary internal circuit block diagram of the battery pack with built-in DIN interface combined with the card-type USB C transfer device according to a preferred embodiment of the present invention.

According to another aspect of the present invention, please refer to FIGS. 5-7, these drawings will depict the card-type USB C transfer device proposed by the present invention connected to a portable power supply with a corresponding built-in DIN interface.

FIG. 5 shows a charging system 500 related to the card-type USB C transfer device 502 of the present invention. The system includes a portable power supply 501, a card-type USB C transfer device 502, and a USB Type C charging adapter 503. The left of FIG. 5 is a cross-sectional view of a portable power supply 501 with a built-in DIN interface and a card-type USB C transfer device 502. The portable power supply 501 (such as battery pack) of the portable power tool includes a tool battery pack module 501*a* inside, a tool battery pack management circuit integration (PCBA) 501*b*, a tool battery pack power terminal board 501*c* coupled to the tool battery pack management circuit integration 501*b*, and a female DIN connector socket 501*d*; the male plug 502*e* of the DIN connector of the USB C transfer device 502 is coupled with the female DIN connector socket 501*d*. The right of FIG. 5 is a front view of a portable power supply 501 (such as battery pack) with a built-in DIN interface and a card-type USB C transfer device 502. The card-type USB C transfer device 502 has two sets of USB type C output ports (502*b*, 502*c*) and a set of USB type A or Micro output port 502*d*, of which the left USB type C output port 502*c* is a bidirectional charging/discharging port, which can be used as a charging port for the USB type C adapter 503 to charge the battery pack module in the portable power supply 501 (such as battery pack) of the machine tool.

FIG. 6 is a schematic diagram showing an application scenario of the card-type USB C transfer device 602 of the present invention combined with a portable power supply (such as battery pack) 601 with a built-in DIN interface. The figure on the right of FIG. 6 shows that the card-type USB C transfer device 602 combined with the portable power supply (such as battery pack) 601 with a built-in DIN interface can be used as the power source for the power tool 605, and at the same time provide a charging interface to charge the battery pack module in the portable power supply (such as battery pack) 601; the diagram on the left of FIG. 6 shows that the card-type USB C transfer device 602 combined with the power tool battery box 601 with a built-in DIN interface can be used as a power source (equivalent to a power bank) for various electronic devices/equipments, such as a notebook computer 607 or a smart phone 609, that is, to charge them, and also to provide a charging interface to charge the battery pack module in the portable power supply (such as battery pack) 601 of the power tool.

FIG. 7 shows an internal circuit block diagram 700 of a battery pack 701 with a built-in DIN interface combined with a card-type USB C transfer device 702, where an external charger (e.g., a USB type C adapter) charges the battery pack 701 or a battery or the battery pack 701 supplies power to external devices, and the power is converted and transmitted through the card-type USB C transfer device 702.

Continuing from the above, the circuit block diagram 700 shown in FIG. 7 illustrates the electrical connection between card-type the USB C transfer device 702 and the rechargeable/dischargeable battery module inside the battery pack 701 with the built-in DIN interface. The coupling between the card-type USB C transfer device 702 and the rechargeable/dischargeable battery module is accomplished by designing the USB C transfer device 702 as a board card with a DIN connector male plug. This design makes the USB C transfer device 702 convenient and easy to install and couple with the DIN connector receptacle disposed on the battery pack 701 to serve as a power transmission interface, and the battery pack 701 is connected to a power tool through a plurality of connecting terminals. When the T_SENS switch of the battery pack is activated, the first PD controller will be notified to turn off the power for external transmission. Only USB type C charging can be performed. If the battery power of the battery pack module for the power tool is insufficient, an USB type C adapter can be inserted immediately to charge the battery pack module in the battery pack 701, and the battery pack module can be charged while discharging.

For the other operation details of the circuit block diagram 700 shown in FIG. 7, except that the connection interface is replaced by a DIN connector interface, the charge/discharge control methods are the same as those explained for the circuit block diagram 400 in FIG. 4, and will not be repeated here.

The present invention has the following advantages compared with prior art:
(1). Batteries of conventional power tool do not have any additional connection interface other than the battery terminal connection interface that can provide connection equipment for charging/discharging the battery pack, and this patent can provide a variety of external connection devices;
(2). Devices with USB C PD 3.0 fast charging technology can generally only be charged or discharged via the USB type C port in one direction. In addition to using the newer USB type C PD3.1/QC4.0 fast charging technology, this patent designs a transfer device circuit that can offer boost/buck bidirectional charge/discharge, which can transfer electricity to other external devices while charging battery pack module. If the Whr capacity of the battery pack is sufficient, it can provide a maximum of 100 W of power for each of the two USB type C ports, or a maximum of 12 W of power for the USB type A or Micro ports. In addition, it also provides connections other than the battery terminals of the power tool battery pack itself to proceed with the charging/discharging.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A card-type USB C transfer device, said transfer device comprising:
a substrate;
a first connection interface disposed on said substrate to couple and electrically connect with a portable power source, enabling said card-type USB C transfer device electrically coupled to said portable power source;
a second connection interface disposed on said substrate to couple and electrically connect with an external device;
an internal circuit electrically connected to said first connection interface and said second connection interface, and been configured to provide more than one power transmission paths between said portable power source and said external device;
wherein said second connection interface includes a first USB type C port, a second USB type C port and a first USB type A or Micro port;
wherein said more than one power transmission paths include a bi-directional power transmission path connecting said first connection interface and said first USB type C port to provide charging and discharging functionalities; and
wherein said bi-directional power transmission path is established by communicating between a first external electronic device connected to said first USB type C port and a first power delivery (PD) controller electrically coupled to said first connection interface and said first USB type C port, (i) when said first external electronic device is a power supply device, power of said first external electronic device is controlled by said first PD controller to provide power to said portable power source via a first charging path; (ii) when said first external electronic device requires power, power of said portable power source is controlled by said first PD controller to supply power to said first external electronic device through a first discharging path.

2. The card-type USB C transfer device of claim 1, wherein said first connection interface is a connection interface including a plurality of connection terminals, said connection interface is gold finger connection interface or a DIN connection interface.

3. The card-type USB C transfer device of claim 1, wherein said more than one power transmission paths include a first unidirectional power transmission path connecting said first connection interface and said second USB type C port, and said portable power source provides a unidirectional power delivery functionality.

4. The card-type USB C transfer device of claim 3, wherein said first unidirectional power transmission path is established by communicating between a second external electronic device connected to said second USB type C port and a second power delivery (PD) controller electrically coupled to said first connection interface and said second USB type C port, when said second external electronic device requires power, power of said portable power source is controlled by said second PD controller to supply power to said second external electronic device through a second discharging path.

5. The card-type USB C transfer device of claim 1, wherein said more than one power transmission paths include a second unidirectional power transmission path connecting said first connection interface and said first USB type A or Micro port, and said portable power source provides a unidirectional power delivery functionality.

6. The card-type USB C transfer device of claim 5, wherein said second unidirectional power transmission path is established by communicating between a third external electronic device connected to said first USB type A or Micro port and said first PD controller, when said third external electronic device requires power, power of said portable power source is controlled by said first PD controller to supply power to said third external electronic device through a third discharging path.

7. The card-type USB C transfer device of claim 4, wherein said first USB type C port and said second USB type C port are respectively connected with said first external electronic device and said second external electronic device at the same time, and request said portable power source to supply power, corresponding power delivery ratios are allocated through a protocol.

8. A card-type USB C transfer device, said transfer device comprising:
a substrate;
a first connection interface disposed on said substrate to couple and electrically connect with a portable power source, enabling said card-type USB C transfer device electrically coupled to said portable power source;

a second connection interface disposed on said substrate to couple and electrically connect with an external device;

an internal circuit electrically connected to said first connection interface and said second connection interface, and been configured to provide a plurality of power transmission paths between said portable power source and said external device;

wherein said plurality of power transmission paths include a bi-directional power transmission path connecting said first connection interface and a first USB type C port, a first unidirectional power transmission path connecting said first connection interface and a second USB type C port, and a second unidirectional power transmission path connecting said first connection interface and a first USB type A or Micro port;

wherein said first USB type C port, said second USB type C port and said first USB type A or Micro port are disposed on said second connection interface;

wherein said first unidirectional power transmission path connects said first connection interface and said second USB type C port, and said portable power source provides a unidirectional power delivery functionality; and wherein said first unidirectional power transmission path is established by communicating between a first external electronic device connected to said second USB type C port and a second power delivery (PD) controller electrically coupled to said first connection interface and said second USB type C port, when said first external electronic device requires power, power of said portable power source is controlled by said second PD controller to supply power to said first external electronic device through a first discharging path.

9. The card-type USB C transfer device of claim 8, wherein said first connection interface is a connection interface including a plurality of connection terminals, said connection interface is gold finger connection interface or a DIN connection interface.

10. The card-type USB C transfer device of claim 8, wherein said bi-directional power transmission path connecting said first connection interface and said first USB type C port provides charging and discharging functionalities.

11. The card-type USB C transfer device of claim 10, wherein said bi-directional power transmission path is established by communicating between a second external electronic device connected to said first USB type C port and a first power delivery (PD) controller electrically coupled to said first connection interface and said first USB type C port, (i) when said second external electronic device is a power supply device, power of said second external electronic device is controlled by said first PD controller to provide power to said portable power source via a first charging path; (ii) when said second external electronic device requires power, power of said portable power source is controlled by said first PD controller to supply power to said second external electronic device through a second discharging path.

12. The card-type USB C transfer device of claim 8, wherein said second unidirectional power transmission path connects said first connection interface and said first USB type A or Micro port, and said portable power source provides a unidirectional power delivery functionality.

13. The card-type USB C transfer device of claim 12, wherein said second unidirectional power transmission path is established by communicating between a third external electronic device connected to said first USB type A or Micro port and said first PD controller, when said third external electronic device requires power, power of said portable power source is controlled by said first PD controller to supply power to said third external electronic device through a third discharging path.

14. The card-type USB C transfer device of claim 11, wherein said first USB type C port and said second USB type C port are respectively connected with said second external electronic device and said first electronic device at the same time, and request said portable power source to supply power, corresponding power delivery ratios are allocated through a protocol.

* * * * *